United States Patent [19]

Owen

[11] Patent Number: 5,228,011

[45] Date of Patent: Jul. 13, 1993

[54] VARIABLE MULTI-STAGE ARC DISCHARGE ACOUSTIC PULSE SOURCE TRANSDUCER

[75] Inventor: Thomas E. Owen, Helotes, Tex.

[73] Assignee: Southwest Research Institute, San Antonio, Tex.

[21] Appl. No.: 698,800

[22] Filed: May 13, 1991

[51] Int. Cl.⁵ ............................................. G01V 1/40
[52] U.S. Cl. ..................................... 367/147; 181/106
[58] Field of Search .................. 367/147; 181/106, 105

[56] References Cited

U.S. PATENT DOCUMENTS

| | | | |
|---|---|---|---|
| 3,613,823 | 10/1971 | Burrage | 367/147 |
| 3,728,671 | 4/1973 | Poston | 367/147 |
| 4,651,311 | 3/1987 | Owen et al. | 367/147 |
| 4,734,894 | 3/1988 | Cannelli et al. | 367/147 |

*Primary Examiner*—J. W. Eldred
*Attorney, Agent, or Firm*—Gunn, Lee & Miller

[57] ABSTRACT

A method of and a system for remotely controlling an adjustable, electrodeless arc discharge acoustic pulse transducer for borehole and underwater operations using high-energy arc discharges to generate high power seismic and acoustic pulses capable of being easily and remotely adjusted in time duration and magnitude such that they can be customized to create waveforms of preferred shapes. The transducer has an insulating ceramic barrier which contains a biconical aperture separating two bodies of electrolyte through which the two zones of liquid make contact and electrically adjustable circuits for switching supplemental amounts of stored electrical energy into the arc discharge circuit at successively delayed time intervals to lengthen the arc discharge current pulse to create the desired waveform shape for detecting variations in the geological features of the formations being probed or for use in ocean acoustic or sonar applications.

16 Claims, 6 Drawing Sheets

VARIABLE MULTI-STAGE ARC DISCHARGE ACOUSTIC PULSE SOURCE TRANSDUCER

BACKGROUND OF THE INVENTION

1. Field of the Invention

This invention relates generally to electroacoustic transducers, and more particularly to the generation of a high-power acoustic pressure pulse using a self-contained electrical arc discharge technique which can be adjusted in its time duration and energy discharge to influence the frequency spectrum of the waveform and thereby facilitating the detection of small differences in the geological features of the formations being probed.

2. Description of Related Art

An efficient technique for generating high-power acoustic pressure pulses is by means of an electric arc discharge in a conducting liquid electrolyte. When such electric arc discharges occur between two closely-spaced, metallic arc discharge electrodes in an aqueous medium such as salt water, the time duration of the discharge is governed essentially by the time constant of the electrical discharge circuit. The electrical discharge circuit typically consists of a high-voltage energy-storage capacitor, a high-voltage switch, copper wire conductors, and the arc discharge chamber which contains the electrodes separated by a ceramic aperture component in the electrolyte liquid. The copper wire conductors and the energy-storage capacitor exhibit small but finite series resistances which, together with the resistance of the arc discharge electrodes and discharge gap, comprise an R-C electrical circuit.

Maximum energy transfer to the arc discharge electrodes occurs when the series resistance in this R-C circuit is minimized. Such efficient energy transfer is desirable, particularly when the acoustic source must operate at very high power. However, whenever the resistance in the discharge circuit is reduced, the arc discharge time constant is also reduced, resulting in a shorter time duration of the acoustic pressure pulse and, hence, a wider spectral bandwidth. This emphasis on higher frequency content in the acoustic pressure pulse is desirable in certain acoustic applications but in many other applications the frequency spectrum of the acoustic pressure pulse must consist primarily of low frequencies. This low frequency requirement is not compatible with reducing the circuit resistance to achieve good energy conversion efficiency. This situation is sometimes alleviated by connecting an inductance in series with the energy-storage capacitor to decrease the rate of energy discharge and thereby increase the arc discharge time constant. However, the inductance component also has resistance associated with its windings and, hence, will inadvertently reduce the energy transfer efficiency even though the arc discharge time constant is governed primarily by the inductance. The presence of the inductance can also introduce undesirable resonance effects in the discharge circuit which can distort the desired acoustic pulse waveform.

A different method was developed in U.S. Pat. No. 4,651,311 "Electrodeless Arc Discharge Acoustic Pulse Transducer", March 1987 (Owen and Schroeder) and broadened in U.S. Pat. No. 4,706,228 "Asymmetrical Lateral-Force Seismic Source Transducer", November 1987 (Owen and Schroeder), both of which are hereby incorporated by reference, to provide useful control of the arc discharge time constant without adding energy dissipating resistance or undesirable resonance effects in the circuit. This method, designated as the electrodeless arc discharge technique, uses dimensional constraints in the arc discharge gap geometry to provide a higher resistance in the discharge circuit during the main energy discharge event so as to increase the discharge time but, at the same time, utilizing the heating effect in the resistance to ultimately vaporize the volume of the electrolyte directly involved in the arc discharge so that any energy lost in this heating process ultimately contributes to the generated acoustic pressure pulse. Time constants in the range of 0.5 msec to 2 msec have been obtained using this technique with energy conversion efficiencies in the range of about 8–10 percent. An undesirable and limiting feature of this method, however, is that the arc discharge time constant is determined by the fixed geometrical shape of the arc discharge gap which constrains the plasma arc. Therefore, the arc discharge time constant provided by this method can only be changed by physically interchanging the arc discharge aperture channel with one having a different geometric shape. Another limitation of this method is that the ability to increase the arc discharge time constant is restricted to maximum values in the range of about 2–4 msec because of the excessive arc discharge aperture channel length required which, since it must constrain the hot, high-pressure plasma, becomes physically overstressed.

An important need for generating longer arc discharge time constants and acoustic pressure pulses is one associated with generating low-frequency acoustic signals in boreholes drilled in oil and gas reservoir rock formations to achieve reversed vertical seismic profile measurements over relatively wide interwell borehole spacings in lossy reservoir formations containing hydrocarbons such as heavy crude oil or tar sands. Another equally important need for generating longer arc discharge time constants and acoustic pressure pulses is one associated with low frequency sound sources used as part of long-range ocean acoustical systems and active long-range sonar systems. For these applications, the seismic or acoustic signals generated by the source must be in the frequency range of 50–500 Hz which will require arc discharge time constants in the range of 2–20 msec. These required values are greater than can be attained by existing arc discharge techniques. This invention is aimed at providing a means by which high-energy arc discharges can be used to generate high power seismic and acoustic pulses capable of being easily and remotely adjusted in time duration, in pressure versus time waveform, and, hence, in dominant spectral content.

SUMMARY OF THE INVENTION

It is an object of the present invention to provide an arc discharge apparatus with a biconical arc discharge aperture channel in the ceramic aperture component to provide bidirectional flow of energy.

It is a further object of the present invention to provide an arc discharge apparatus that can be mass produced in an optimum shape and thereby eliminate the need for custom-made parts.

It is a further object of the present invention to provide an arc discharge apparatus that can be electrically adjusted to alter the amount of energy discharged in the arc discharge chamber.

It is a further object of the present invention to provide an arc discharge apparatus that can be electrically adjusted to alter the timing of the energy discharge in the arc discharge chamber.

It is a further object of the present invention to provide an arc discharge apparatus that can be electrically adjusted from a remote location.

It is another object of the present invention to provide a system for and a method of using electrically adjustable arc discharge time constants among several stages of triggered discharges whereby the combination of such discharges form an acoustic pressure pulse and corresponding discharge current waveform.

It is another object of the present invention to provide a system for and a method of lengthening an acoustic pressure pulse by switching supplemental amounts of stored electrical energy into the electrical discharge circuit at successively delayed time intervals such that the lengthening of this pulse causes the frequency spectrum of such lengthened pulse to be concentrated at a correspondingly lower range of frequencies.

It is another object of the present invention to provide a system for and a method of transferring appropriate time-delay information or a real-time sequence of trigger pulses to one or more remote acoustic pulse source modules, each containing a multi-stage arc discharge arrangement for controlling or adjusting its discharge current waveform, so as to achieve remote control of the respective acoustic waveforms to independently and systematically control the initiation times of the waveforms produced by each source module in a multiple-element array of acoustic sources.

DETAILED DESCRIPTION OF THE PREFERRED EMBODIMENT

Figure 1A:
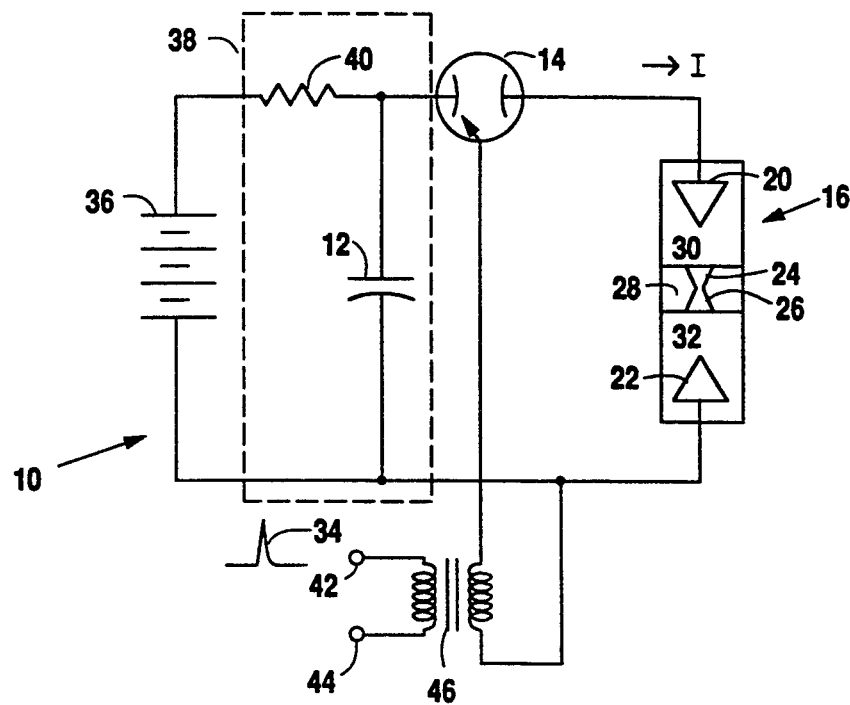
FIG. 1A is a schematic wiring diagram of a single-stage arc discharge acoustic pressure pulse generator circuit.
Figure 1B:
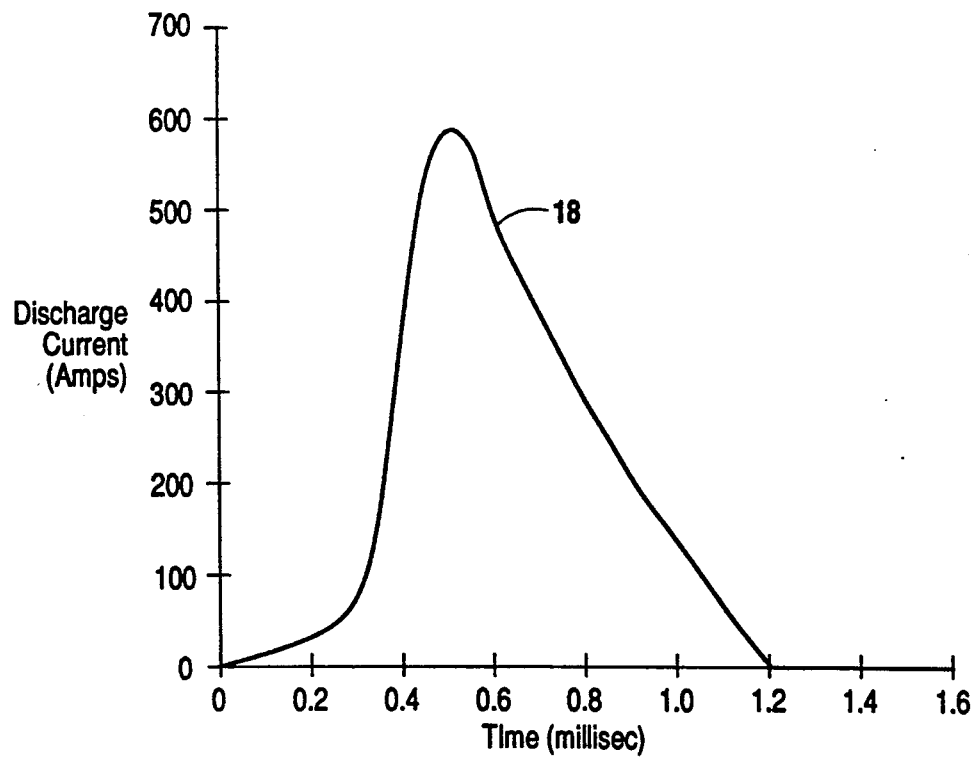
FIG. 1B is a typical representation of the discharge current waveform produced by the single-stage arc discharge acoustic pressure pulse generator circuit of FIG. 1A.

According to prior art as illustrated by an arc discharge acoustic pressure pulse generator circuit 10 in FIG. 1A and disclosed in U.S. Pat. No. 4,651,311 and U.S. Pat. No. 4,706,228, which are hereby incorporated by reference, an energy-storage capacitor 12 switched by a vacuum arc switch 14 across an arc discharge chamber 16 produces a discharge current waveform 18 typical of that illustrated in FIG. 1B. This discharge current waveform 18 is characteristic of the electric arc discharge produced by a 1,000-Joule energy discharge from electrodes 20 and 22 through a 30-degree biconical arc discharge aperture channel 24, approximately one inch long on each cone 26, through a ceramic aperture component 28 located between bodies of electrolyte 30 and 32.

The time duration of the discharge current pulse is approximately 1.2 msec and the peak current (approximately 600 amperes) occurs at about 0.6 msec after the initiation of the arc discharge process by a trigger pulse 34. The arc discharge acoustic pressure pulse generator circuit 10 is comprised of a battery 36, an R-C circuit 38 containing a resistor 40 and energy-storage capacitor 12, input connections 42 and 44, a transformer 46, vacuum arc switch 14 and arc discharge chamber 16.

Figure 2A:
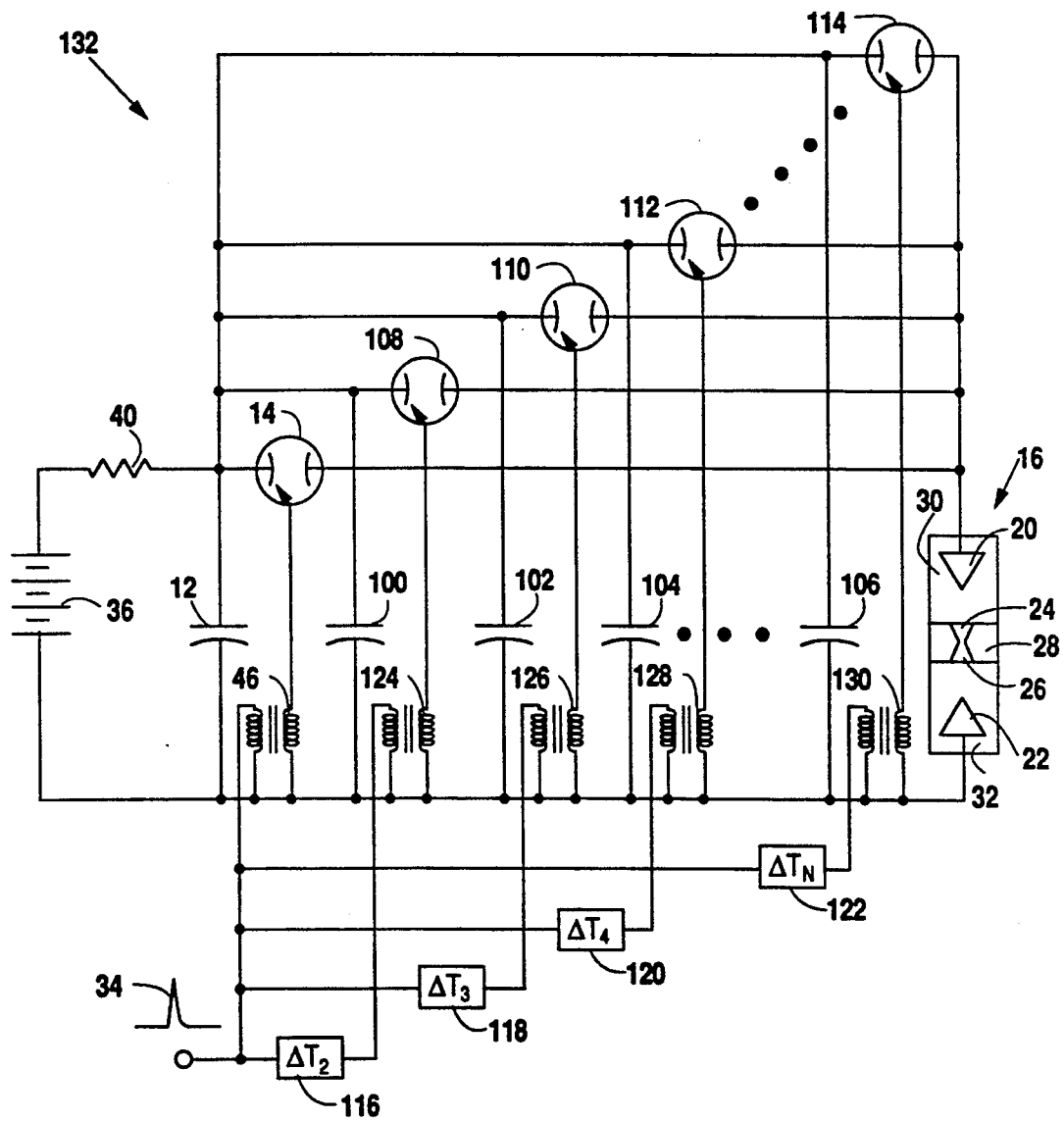
FIG. 2A is a schematic wiring diagram of a multi-stage arc discharge acoustic pressure pulse generator circuit.

FIG. 2A illustrates the addition of supplemental capacitors 100, 102, 104 and 106 and switches 108, 110, 112 and 114, respectively, connected in parallel with the single energy-storage capacitor 12 and vacuum arc switch 14 employed in the arc discharge acoustic pressure pulse generator circuit 10 of prior art. In this arrangement, the supplemental capacitors 100, 102, 104 and 106 may be switched across the arc discharge chamber 16 at independently controlled time delays 116, 118, 120 and 122, respectively, by transformers 124, 126, 128 and 130, respectively, after the energy-storage capacitor 12 is switched on by a signal through transformer 46. This adds supplemental energy to the pressure pulse generated from the energy of R-C circuit 38 (See FIG. 1A) in a predetermined and controlled manner. Several degrees of freedom are provided by this technique, namely; (1) the amount of energy transferred from each supplemental capacitor 100, 102, 104 and 106 will be governed by either the capacitance value or the voltage to which it is charged; (2) the value of the supplemental capacitance will govern the energy discharge time constant; and (3) the timing of the closure of switches 108, 110, 112 and 114 will govern the times at which the supplemental energy discharge will begin.

Figure 2B:
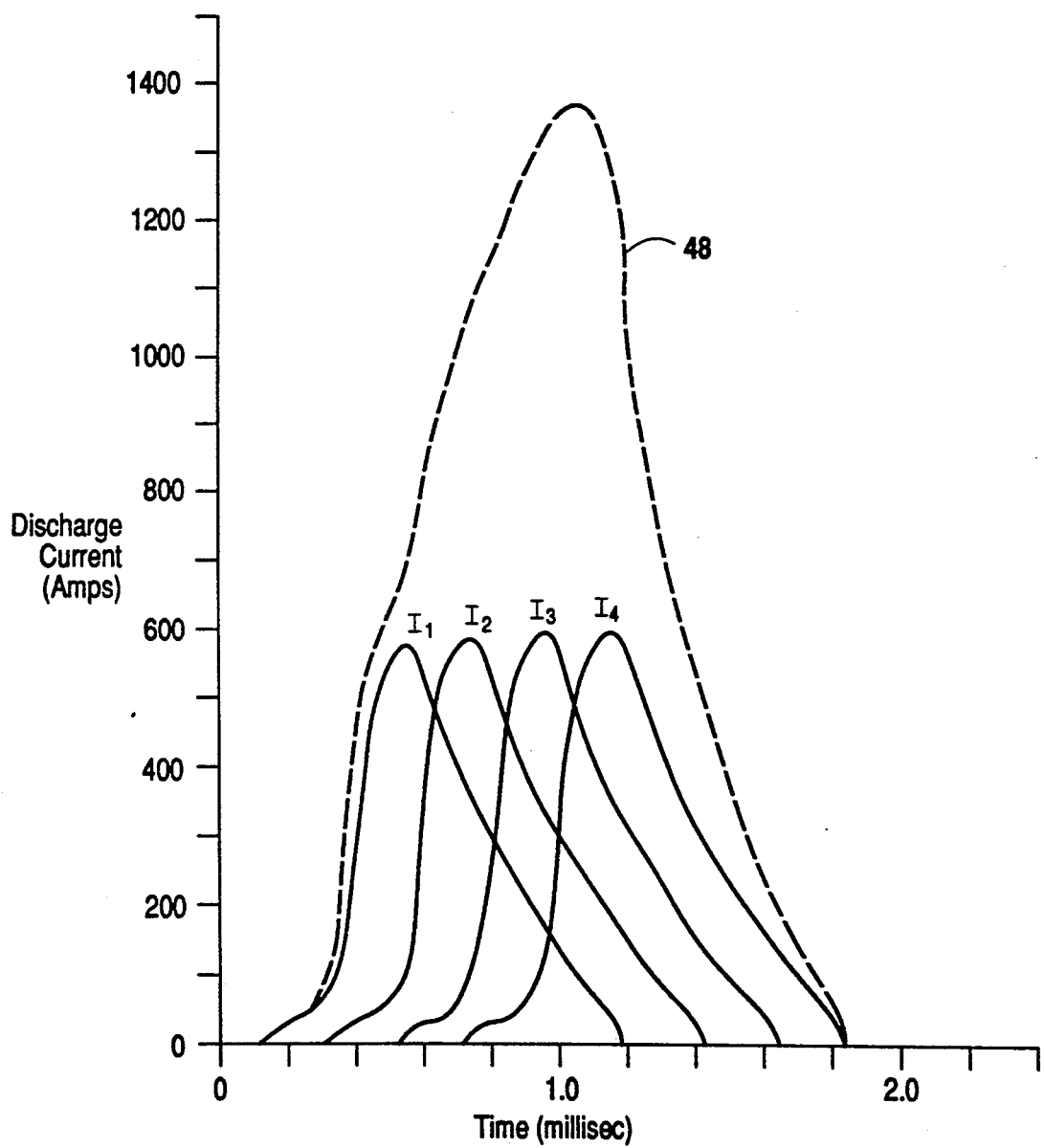
FIG. 2B is a typical representation of the combined discharge current waveform produced by the multi-stage arc discharge acoustic pressure pulse generator circuit of FIG. 2A.

As a result of this flexible electrically-controlled method of adding supplemental energy across electrodes 20 and 22 to the arc discharge, the arc discharge may be extended in time duration and caused to have a combined discharge current waveform 48 of a preferred shape, as shown in FIG. 2B, both of which will govern the frequency spectrum and waveform of the resulting acoustic pressure pulse. By means of this technique, the requirement for replacing a fixed ceramic aperture component 28 with another ceramic aperture component 28 of different geometry in order to change the discharge time constant is not required. FIG. 2B assumes there are only four discharge capacitors, such as energy storage capacitors 12, 100, 102 and 104 shown in FIG. 2A.

When adapted to any of the applications mentioned earlier, the energy storage capacitors 12, 100, 102, 104 and 106, high-voltage vacuum arc switches 14, 108, 110, 112 and 114, and resistor 40 must be located as close to the arc discharge chamber 16 as practical in order to minimize nonproductive energy losses in currents $I_1$ to $I_n$ in the high-current discharge circuits. Energy storage capacitor 106 and vacuum arc switch 114 are simply representative of the last of a number, "n", of high-energy-rate discharge circuits.

Figure 3:
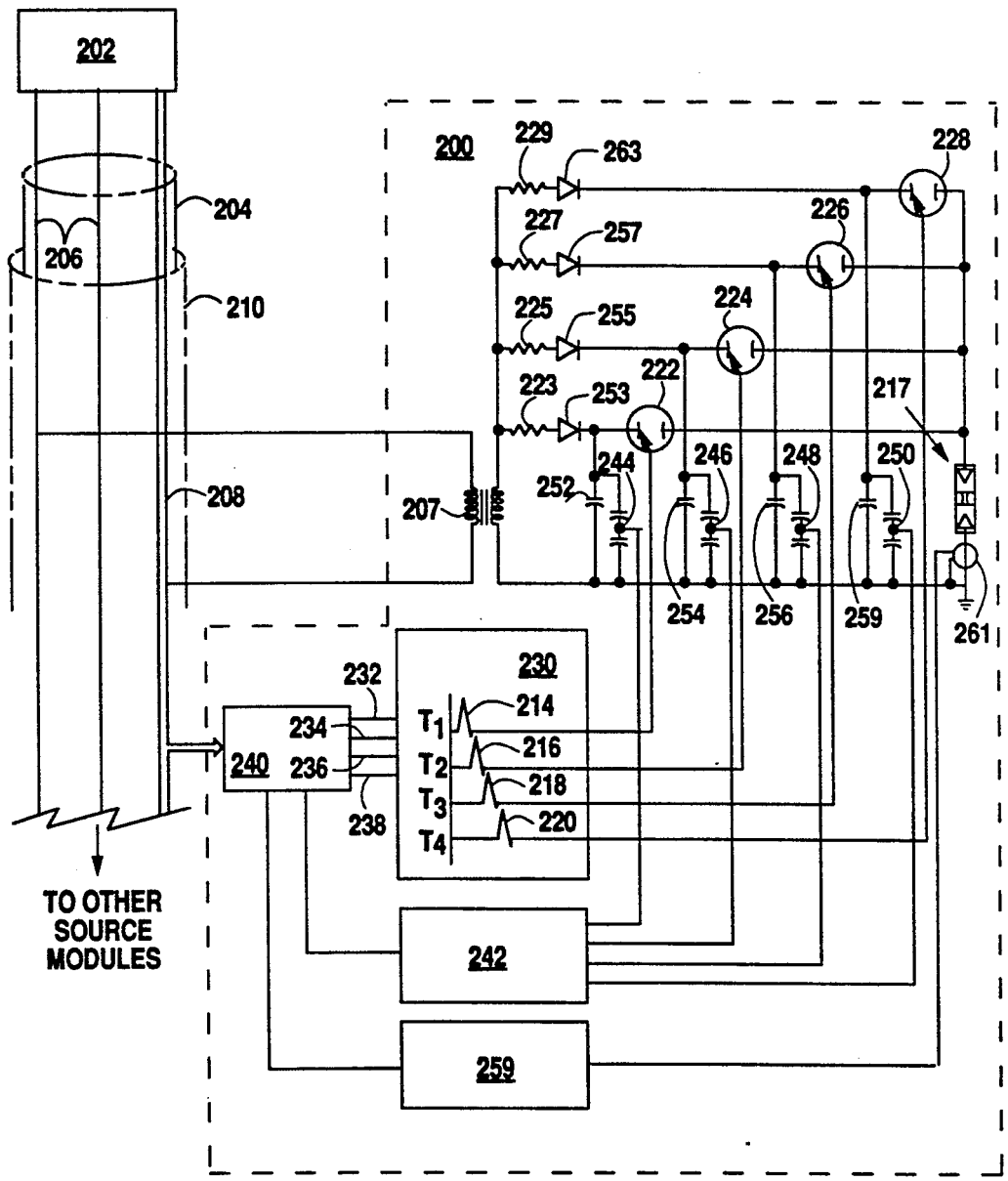
FIG. 3 is a schematic, partial vertical sectional view of the preferred embodiment of the invention, including a schematic wiring diagram of a remote subsurface pulse source unit.

A multi-stage arc discharge acoustic pulse source of this type will generally require that the energy discharge components be contained in a remotely housed, subsurface unit 200 and connected to a surface control unit 202 by a cable 204 containing a power connection 206 and a control connection 208 as shown in FIG. 3. Therefore, the subsurface unit 200 is typically operated remotely, in some applications several thousand feet deep in a borehole 210 or below the ocean surface, making any physical adjustments or interchange of components in the subsurface unit 200 impractical.

Thus, for purposes of selecting a different combined discharge current waveform 48, as shown in FIG. 2B, without the necessity of retrieving the subsurface unit 200, the subsurface unit 200 may be changed by means of controlled adjustments in the relative time delays 116, 118, 120 and 122 (See FIG. 2A) from the surface control unit 202 (See FIG. 3). Specific advantages are gained in the borehole seismic applications and ocean acoustic applications through the ability of this invention to change the combined discharge current waveform 48 and pulse time duration.

As a further extension of this concept, more than one such subsurface unit 200 may be operated from the same power connection 206, control connection 208 and surface control unit 202 to serve as a multiple-element source array in which each remote unit 200 may be independently operated as described above from the surface control unit 202. To help eliminate interference noise, the control connection 208 in the cable 204 may use fiber-optic communication links to carry control signals employing either analog or digitally-encoded commands as part of a multiple element seismic or acoustic source system.

FIG. 3 illustrates a four-stage electric arc discharge pulse source housed in the subsurface unit 200 remotely powered and controlled by cable 204. The arrangement in FIG. 3 indicates that trigger pulses 214, 216, 218 and 220 in the capacitor discharge circuits may either be predetermined at the surface control unit 202 and transmitted to the respective vacuum arc switches 222, 224, 226 and 228 or may originate in a trigger conditioner 230 of the subsurface unit 200. In the later case, only the time delay control pulse values desired in the arc discharge circuits are telemetered as switch triggering commands 232, 234, 236 and 238 from a fiber-optics interface 240 in the subsurface unit 200. Signals indicating energy storage charge status 242, which is determined by high impedance capacitance measuring devices 244, 246, 248 and 250 across capacitors 252, 254, 256 and 258, respectively, and a discharge current waveform 259 as shown in FIG. 3, provide useful monitoring and control information about discharges in arc discharge chamber 217 which can be transmitted to the surface control unit 202 as an aid in testing, adjusting, and monitoring the operation of the subsurface unit 200 from the surface. The analog discharge current waveform 259 is sensed by inductive pickup device 261.

Power to each of the capacitors 252, 254, 256 and 258 is provided through transformer 207; resistors 223, 225, 227 and 229; and diodes 253, 255, 257 and 261, respectively.

Figure 4A:
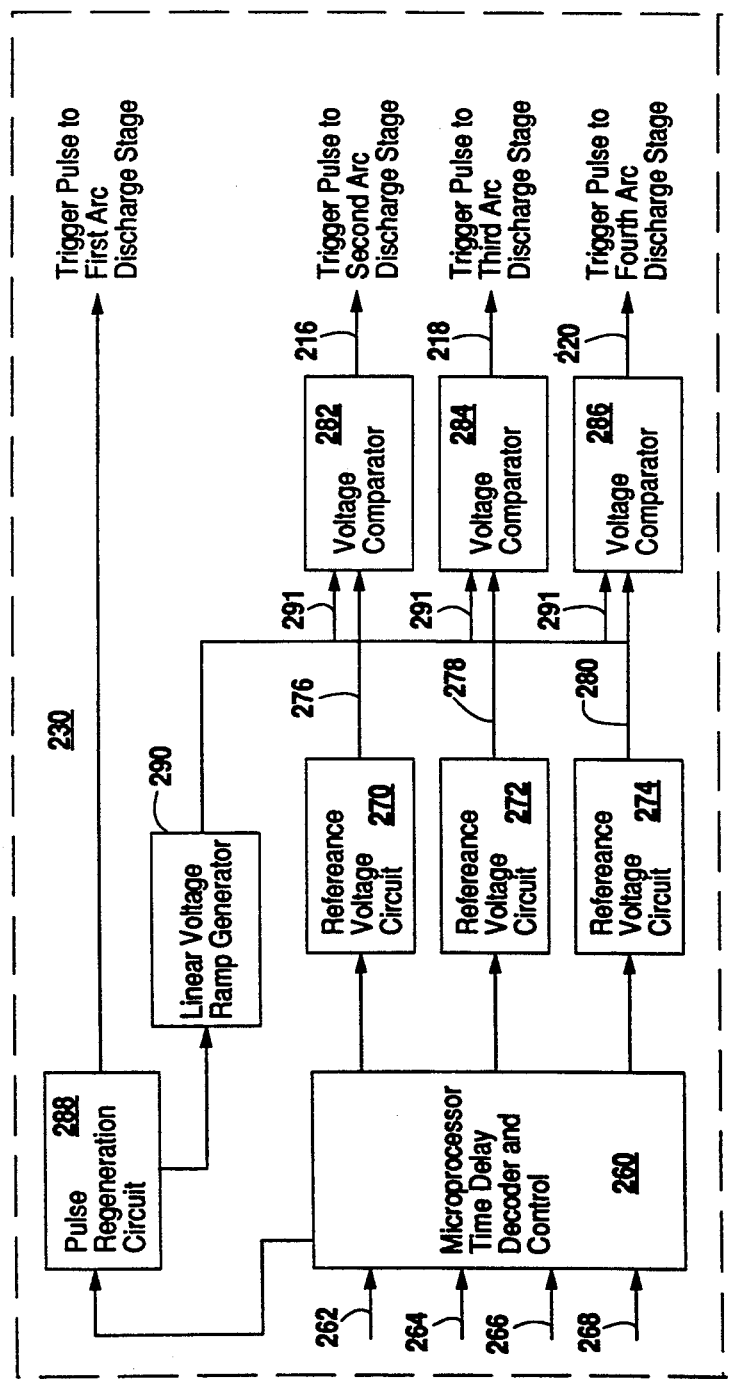
FIG. 4A is a schematic, block diagram showing the trigger conditioner subsystem of FIG. 3.
Figure 4B:
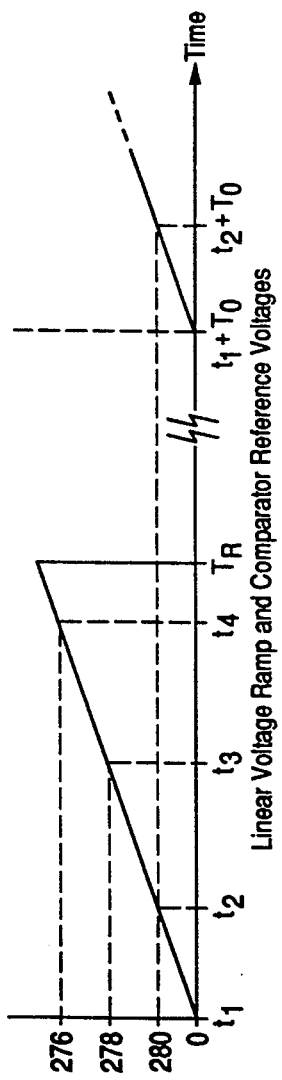
FIG. 4B is a timing chart of the remote multi-stage trigger conditioner subsystem employing a linear voltage ramp and programmable trigger reference voltages.

One method by which the time-delayed trigger pulses 214, 216, 218 and 220 might be generated either at the surface control unit 202 or in the subsurface unit 200 is illustrated in FIGS. 4A and 4B. In operation, a microprocessor 260 in the trigger conditioner 230, shown in block form in FIG. 4A, first receives four time-delay control commands 232, 234, 236 and 238 in digital form from the surface control unit 202 (See FIG. 3). The microprocessor 260 recognizes these time-delay control commands 232, 234, 236 and 238 as being intended for a particular subsurface unit among a number of similar subsurface units in an array. The time-delay control commands 234, 236 and 238 convey voltage reference settings which, when decoded by the microprocessor 260, are fed to reference voltage circuits 270, 272 and 274, respectively, whose outputs are the specified reference voltages 276, 278 and 280, respectively, designated by control commands 234, 236 and 238. These reference voltages 276, 278 and 280 are applied to three corresponding voltage comparator circuits 282, 284 and 286 whose outputs are the trigger pulses 216, 218 and 220 which are sufficient to trigger the vacuum arc switches 224, 226 and 228 in their respective arc discharge circuits.

To initiate the multi-stage arc discharge sequence, the time-delay command 232 is transmitted to the subsurface unit 200 from the surface control unit 202 and received by microprocessor 260 in the appropriate subsystem unit 200. This time-delay command 232 is regenerated by a pulse regeneration circuit 288 and serves a twofold purpose. First, the regeneration circuit 288 sends trigger pulse 214 to vacuum arc switch 222 at time $t_1$, as shown in FIG. 4B. The regeneration circuit 288 also sends a signal to a linear voltage ramp generator 290 which generates a linear voltage timing function 291 which is fed to voltage comparator circuit 282, 284 and 286, respectively. As this voltage timing function 291 increases linearly with time, the lowest reference voltage 276 is reached at a time $t_2$ causing the corresponding voltage comparator circuit 282 to send the trigger pulse 216 to the vacuum arc switch 224 of the second arc discharge circuit. The ramp timing function continues to increase in voltage until the next reference voltage 278 is reached at time $t_3$ causing the voltage comparator circuit 284 to send trigger pulse 218 to the vacuum arc switch 226 of the third arc discharge circuit. Finally, when the ramp function reaches the highest reference voltage 280 at time $t_4$, the corresponding voltage comparator circuit 286 sends the trigger pulse 220 to the vacuum arc switch 228 in the fourth arc discharge circuit.

This process may be repeated after a sufficient elapsed time, $T_O$, to allow the linear ramp function to return to zero at time $T_R < T_O$ and the energy storage capacitors 252, 254, 256 and 258 to recharge in preparation for the next arc discharge cycle. Thus, by changing the reference voltages 276, 278 and 280 that are applied to the corresponding voltage comparator circuits 282, 284 and 286, the trigger times $t_2$, $t_3$ and $t_4$ of the second, third, and fourth arc discharge stages, respectively, can be shifted relative to the trigger time $t_1$ of the first arc discharge circuit. This prescribed sequence of delayed trigger pulses 214, 216, 218 and 220 may be generated in a repeated manner until a new set of time delay control commands 232, 234, 236 and 238 are received and decoded by the microprocessor 260.

Figure 5:
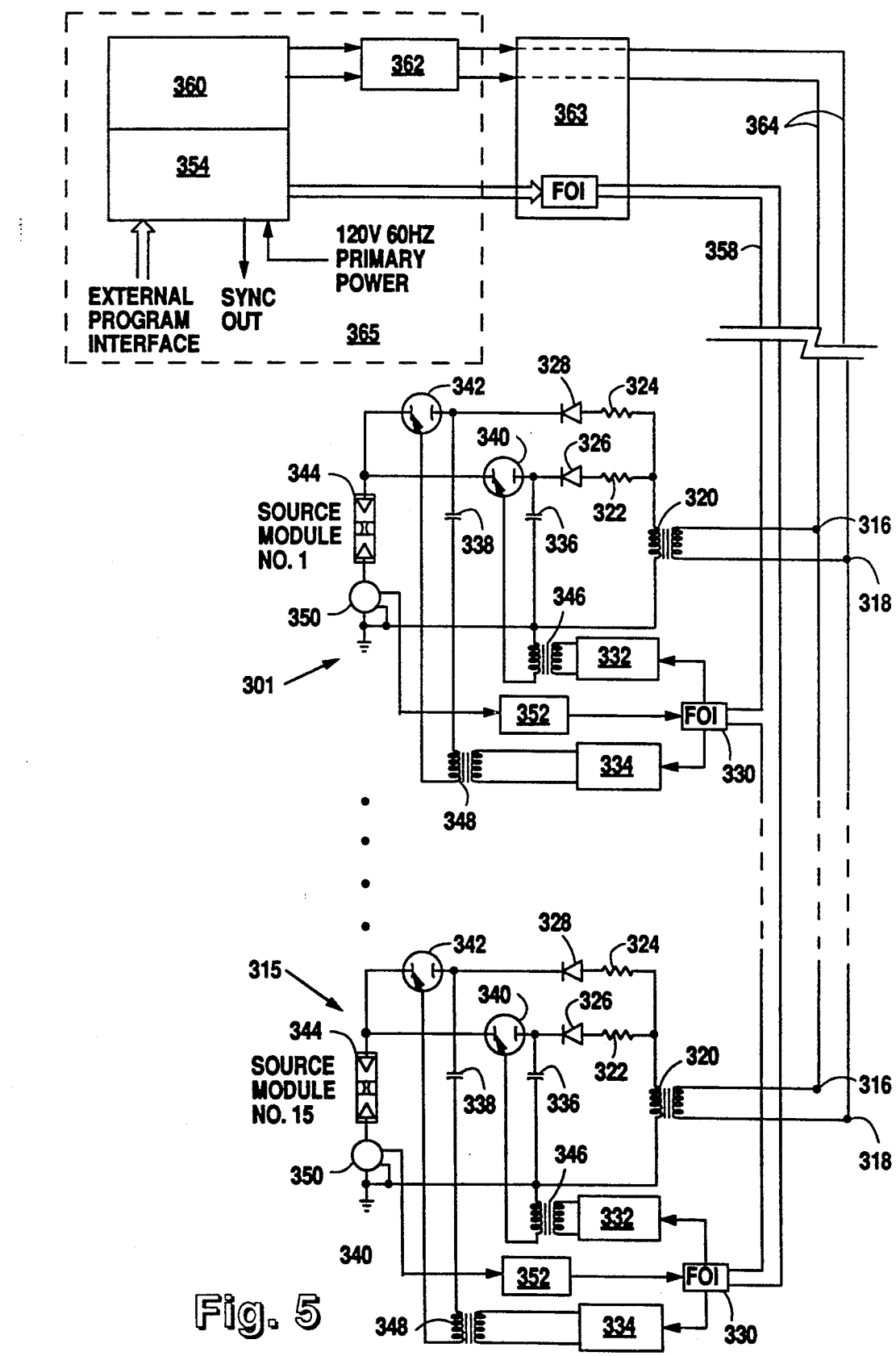
FIG. 5 is a schematic, pictoral view of a preferred embodiment of a system utilizing a two-stage arc discharge acoustic source array.

FIG. 5 illustrates another embodiment for triggering a fifteen-element array of subsurface units 301 through 315, each consisting of a two-stage arc discharge source. Each subsurface unit 301 through 315 contains AC power connectors 316 and 318 connected to a transformer 320. The current flows from transformer 320 through resistors 322 and 324. Diodes 326 and 328 rectify the current flow in one direction. A fiber-optics interface 330 receives the control signals from surface control unit 356, decodes and sends the signal pulses to trigger generators 332 and 334. Capacitors 336 and 338 are switched, by vacuum arc switches 340 and 342, across an arc discharge chamber 344 when transformers 346 and 348 receive the signal pulses from trigger generators 332 and 334. A current sensing device 350 sends a feedback signal through a synchronization driver 352.

In FIG. 5 the time-delay values for the vacuum arc switches 340 and 342 are preset in an array programmer unit 354 in surface control unit 356 using a method such as that shown in FIG. 4 or another method in which a microprocesor is used to generate the desired programmed sequence of trigger pulses. These trigger pulses are transmitted to the subsurface units 301 through 315 via a dedicated fiber-optic transmission cable 358 to the fiber-optic interface 330 for the respective subsurface units 301 through 315 which provide a signal to the trigger generators 332 and 334. A synchronizing pulse, discharge current waveform and energy charge status voltages may also be transmitted from each subsurface unit 301 through 315 to the surface control unit 356 to be monitored or used for other system operating and control purposes at the surface. This surface control unit 356 consists of a power supply 360, array programmer 354 and a transformer 362 which provides 60-cycle, 115 volt AC power through a power cable 364, to subsurface units 301 to 315. A wireline winch and cable 363 is used to raise and lower the subsurface units 301 through 315.

The surface control unit 356 may receive its primary power from an external source, or may generate power internally. Likewise, a synchronization signal may be internally generated or external. Similarly, an external program interface may be provided as an optional feature, or the programming may be part of the surface control unit 356.

In its general form, the multi-stage arc discharge pulse system may utilize any number of arc discharge circuits containing either the same or different values of energy storage capacitors 336 and 338 in those circuits and the capacitors 336 and 338 may be triggered at different times $t_2$ through $t_N$ relative to the trigger time $t_1$ of the initial R-C circuit so as to produce a wide range of overall arc discharge time durations and resulting discharge current pulse waveforms. These freedoms of design and electrically controlled adjustments will permit the arc discharge process to generate a corresponding wide range of acoustic pulse waveforms having similarly related time durations.

I claim:

1. An acoustic pulse source transducer for generating variable acoustical pulses in subsurface fluids from electric charges comprising:
   a source of electric power;
   a capacitor for charging through a resistor from a first side of said source of electric power, said capacitor and said resistor forming an R-C network;
   arc discharge chamber for being located in said subsurface fluids, said arc discharge chamber being connected to a second side of said source of electric power;
   a vacuum arc switch connected on a first side to said resistor and said capacitor and on a second side to a first side of said arc discharge chamber;
   means for triggering said vacuum arc switch to allow current flow therethrough from said capacitor to said arc discharge chamber to create an acoustical pulse;
   a plurality of circuits formed from other capacitors and other vacuum arc switches as described hereinabove, said plurality of circuits being connected in parallel between said source of electric power and said arc discharge chamber, each of said plurality of circuits having separate timing means to independently adjust timing of each separate one of said vacuum arc switches via said means for triggering thereby allowing variations in said current flow to said arc discharge chamber and, hence, producing said variable acoustical pulse in said subsurface fluids.

2. The acoustic pulse source transducer as given in claim 1 wherein said means for triggering is a signal received from a remote location, each of said plurality of circuits having a separate time delay of said separate timing means to separately trigger each of said vacuum arc switches and, hence, vary said current flow to said arc discharge chamber and said acoustical pulse therefrom.

3. The acoustic pulse source transducer as given in claim 2 wherein said means for triggering includes a separate transformer for each of said circuits connected on a first side to a trigger for each of said vacuum arc switches and on a second side to said signal received from said remote location, said separate time delays being between said second side of said transformer and said signal received from said remote location.

4. The acoustic pulse source transducer as given in claim 1 wherein said arc discharge chamber has a biconical arc discharge aperture channel therein.

5. A system having surface and subsurface units for producing an acoustical pulse in subsurface fluids, said acoustical pulse being variable in magnitude or duration from a surface location by said surface unit without removing said subsurface unit, comprising:
   said surface unit having a power supply and means for programming said subsurface unit;
   connecting means between said surface unit and said subsurface unit;
   said subsurface unit having at least one arc discharge chamber for locating in said subsurface fluids, a first side of said arc discharge chamber being connected to said power supply through said connecting means;
   a plurality of parallel arc discharge circuits in said subsurface unit connected between a second side of said arc discharge chamber and said power supply via said connecting means, each of said parallel arc discharge circuits having:
   (1) charge storage means for being charged from said power supply;
   (2) arc switch means having a trigger for discharging energy stored in said charge storage means across said arc discharge chamber; and
   (3) means for triggering said trigger of said arc switch means;
   said means for programming in said surface unit communicating through said connecting means to said means for triggering in said subsurface unit timing signals to vary timing of said discharging energy from each of said charge storage means across said arc discharge chamber, a combination of said discharging energy from each of said parallel arc discharge circuits giving said acoustical pulse variable magnitude or duration depending on said timing signals.

6. The system as recited in claim 5 wherein said means for triggering includes:

microprocessor for receiving command signals from said means for programming, said microprocessor decoding said command signals to establish reference voltages in reference voltage circuits;

voltage generator means to establish a variable voltage upon receiving said command signals via said microprocessor;

comparator means for receiving said variable voltage and said reference voltage to give different trigger pulses to each of said means for triggering and, hence, vary said acoustical pulse.

7. The system as recited in claim 5 wherein said means for programming is a computer located at said surface unit for generating said command signals.

8. The system as recited is claim 5 wherein said connecting means is a cable from said surface unit to said subsurface unit having power lines therein for providing connections to said power supply by said subsurface unit and fiber optic control lines for said command signals therethrough, said subsurface unit having a fiber optic interface for transferring said command signals therethrough to said microprocessor.

9. The system as recited in claim 7 or 6 further including monitor means connected across each of said charge storage means to monitor charge therein and to said arc discharge chamber to determine discharge therethrough.

10. The system as recited in claim 5 wherein said charge storage means is a capacitor in each of said arc discharge circuits and said arc switch means is a vacuum arc switch in each of said arc discharge circuits.

11. The system as recited in claim 5 wherein said plurality of said arc discharge circuits in said subsurface unit are connected to a plurality of said arc discharge chambers for creating separate of said acoustical pulses in said subsurface fluids thereby providing said variation in magnitude or duration by combining said separate acoustical pulses.

12. A method of generating an acoustical pulse in a subsurface unit and varying subsequent acoustical pulses in said subsurface unit by programming changes in a surface unit, consisting of the following steps:

connecting said surface unit to said subsurface unit to provide power and communication therebetween;

lowering said subsurface unit below a surface;

programming a computer in said surface unit to give timing signals to said subsurface unit;

charging a plurality of energy storage devices in said subsurface unit from said surface unit;

triggering a plurality of switches by said timing signals to discharge said charges on said plurality of said energy storage devices through an arc discharge chamber, said switches and said energy storage devices being connected in parallel, said discharge resulting in said acoustical pulse produced by a first combined current from each of said plurality of said energy storage devices;

varying said timing signals from said computer in said surface unit to discharge said plurality of said energy storage devices at different times to give a second combined current, said acoustical pulse varying in magnitude or duration as said timing signals are varied; and repeating said varying step to give other said acoustical pulses of different magnitude or duration.

13. The method of generating said acoustical pulse as recited in claim 12 wherein said subsurface unit has multiple modules with each of said multiple modules having said programming, charging and triggering steps given in claim 12; said multiple modules generating a combination of said acoustical pulses which combination can be varied in said magnitude or duration.

14. The method of generating said acoustical pulse as recited in claims 12 or 13 consisting of the additional step of feeding back feedback signals to said surface unit information about said arc discharge chamber.

15. The method of generating said acoustical pulse as recited in claim 14 including a further step of reprogramming said computer to give different magnitudes and durations of said acoustical pulses, alone or in combination.

16. The method of generating said acoustical pulse as recited in claim 15 wherein said connecting step includes fiber optics for said communication therebetween, said timing signals being transmitted over said fiber optics as well as said feedback signals.

* * * * *